(12) United States Patent
Ibe et al.

(10) Patent No.: US 7,618,201 B2
(45) Date of Patent: Nov. 17, 2009

(54) OPTICAL MODULE

(75) Inventors: Sayoko Ibe, Tokyo (JP); Noriyuki Yokouchi, Tokyo (JP); Kengo Muranushi, Tokyo (JP); Tatsuya Kimoto, Tokyo (JP); Tatsuro Kurobe, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 90 days.

(21) Appl. No.: 11/910,978

(22) PCT Filed: Mar. 22, 2007

(86) PCT No.: PCT/JP2007/055871
§ 371 (c)(1),
(2), (4) Date: Oct. 9, 2007

(87) PCT Pub. No.: WO2007/108508
PCT Pub. Date: Sep. 27, 2007

(65) Prior Publication Data
US 2008/0166098 A1    Jul. 10, 2008

(30) Foreign Application Priority Data
Mar. 22, 2006 (JP) .............................. 2006-078227

(51) Int. Cl.
| G02B 6/36 | (2006.01) |
| G02B 6/12 | (2006.01) |
| G02B 6/26 | (2006.01) |
| G02B 6/34 | (2006.01) |
| G02B 6/30 | (2006.01) |
| G02B 6/255 | (2006.01) |
| G02B 6/10 | (2006.01) |
| G02B 6/00 | (2006.01) |
| H04B 10/12 | (2006.01) |
| G02B 7/02 | (2006.01) |
| H01S 3/13 | (2006.01) |
| H01S 3/04 | (2006.01) |
| H01S 3/08 | (2006.01) |
| C03C 27/00 | (2006.01) |
| C03C 27/02 | (2006.01) |

(52) U.S. Cl. .............................. 385/93; 385/14; 385/15; 385/31; 385/37; 385/49; 385/52; 385/53; 385/84; 385/85; 385/86; 385/88; 385/89; 385/92; 385/95; 385/129; 385/134; 359/337.2; 359/820; 372/32; 372/34; 372/36; 372/96; 65/36; 65/43; 65/59.4

(58) Field of Classification Search ................. 385/14, 385/15, 31, 37, 49, 52, 53, 84–86, 88, 89, 385/92, 93, 95, 129, 134; 359/337.2, 820; 372/32, 34, 36, 96; 65/36, 43, 59.4
See application file for complete search history.

(56) References Cited

U.S. PATENT DOCUMENTS

| 2002/0126717 A1* | 9/2002 | Nasu et al. ..................... 372/32 |
| 2003/0012524 A1* | 1/2003 | Nasu et al. ..................... 385/92 |
| 2006/0104575 A1* | 5/2006 | Ikeda et al. .................... 385/88 |
| 2006/0251362 A1* | 11/2006 | Uekawa ....................... 385/93 |

FOREIGN PATENT DOCUMENTS

| JP | 63 178201 | 7/1988 |
| JP | 2001 59925 | 3/2001 |

* cited by examiner

*Primary Examiner*—Brian M. Healy
*Assistant Examiner*—Hung Lam
(74) *Attorney, Agent, or Firm*—Oblon, Spivak, McClelland, Maier & Neustadt, L.L.P.

(57) ABSTRACT

An optical-waveguide device mounted on a fixing member having a pair of opposing upright walls and a sub-mount unit including a metallic sub-mount of a rectangular solid shape inserted between the opposing upright walls and a nonmetallic sub-mount of a rectangular solid shape mounted on the metallic sub-mount, and fixed onto a base table. The fixing member and the sub-mount unit as well as the fixing member and the base table are spot-welded together using YAG welding.

9 Claims, 10 Drawing Sheets

FIG. 7
(e) 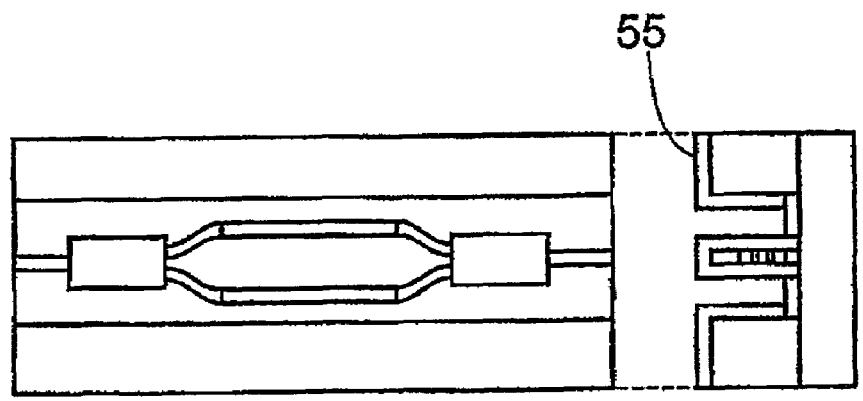
(f) 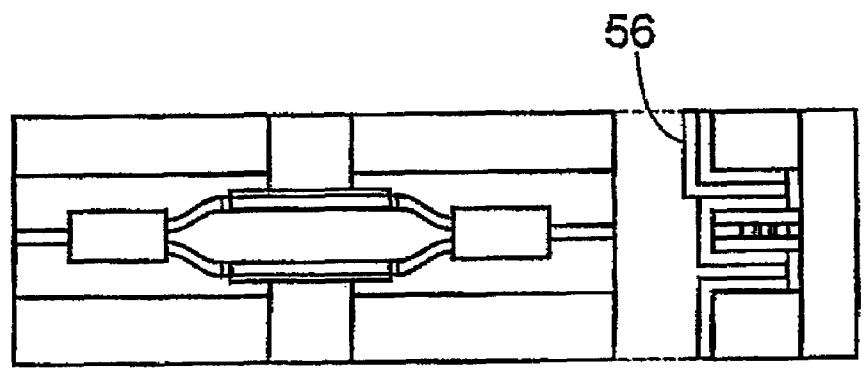
(g) 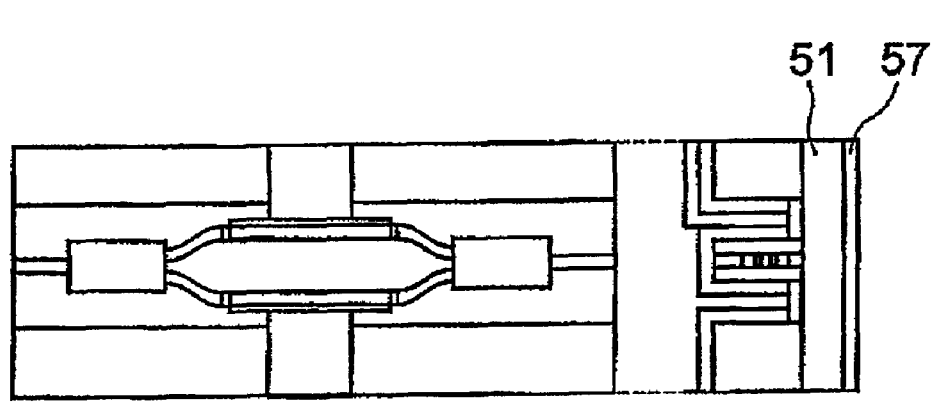

FIG. 11
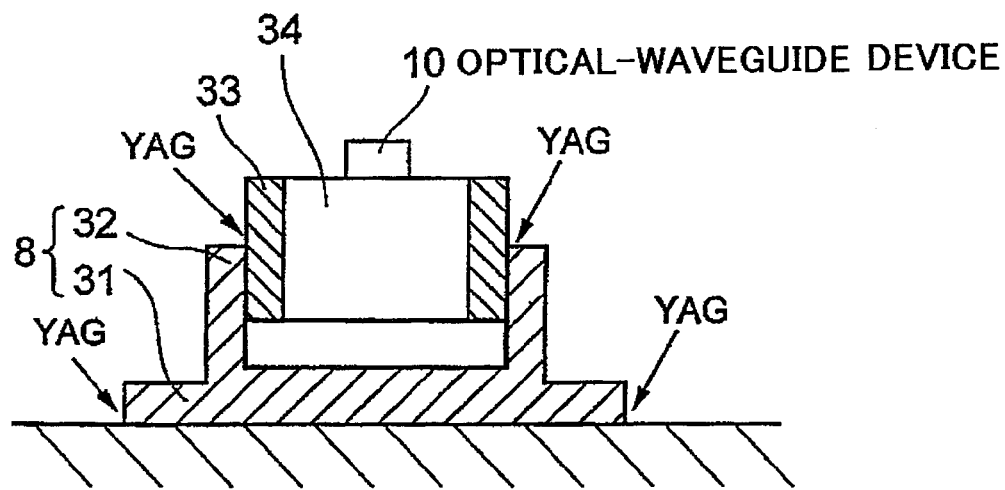
(a)
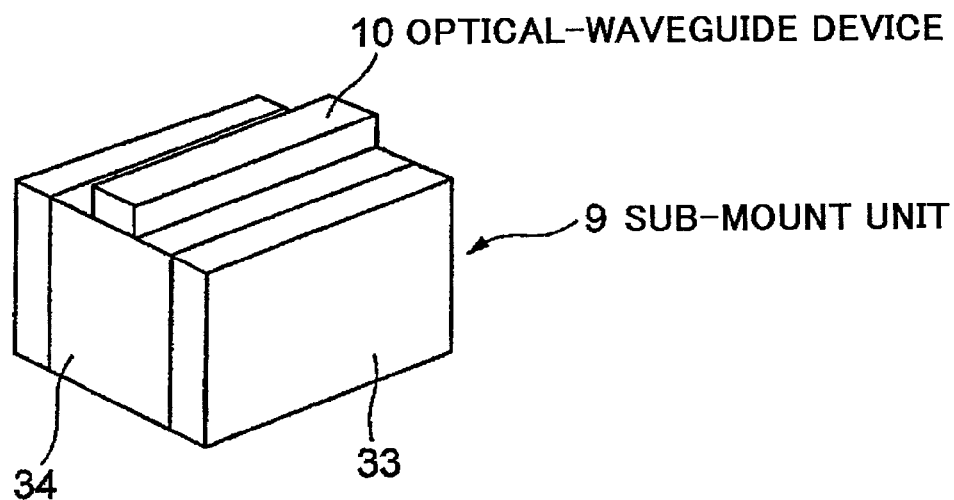
(b)

OPTICAL MODULE

TECHNICAL FIELD

The present invention relates to an optical module and a method for manufacturing the same and, more particularly, to an optical module including a hybrid optical integrated device and a method for manufacturing the same.

BACKGROUND ART

Recently, wide spread of the Internet increases the demand for a smaller-size optical system. One of the solutions thereof now investigated is to integrate together optical-waveguide devices each including an optical waveguide. The techniques to be employed for integration of these optical devices include monolithic integration and hybrid integration. The monolithic integration is the ultimate technique for achieving a smaller size; however, it is difficult to optimize the functions of the individual optical devices because of the restriction on the fabrication process, the non-negligible influence of the reflected and returned light in the structure of integrated laser devices, and so on. In addition, due to a larger size of the optical device and a complicated fabrication process, there is a concerned possibility of a lower product yield.

On the other hand, the hybrid integrated device attracts a larger attention due to the easy optimization of the functions of the individual optical devices, easy design change, capability of integration of optical devices made from different materials and wider range of application thereof, although the hybrid integrated device necessitates a larger number of parts, such as optical lenses, required for optical coupling.

In the hybrid integrated device, it is especially important to position-align the optical-waveguide devices with each other. The conventional techniques for positioning of the devices in the vertical direction include one wherein a sub-mount for mounting thereon an optical-waveguide device is aligned in advance with another optical-waveguide device in the vertical direction, and one wherein a spacer is used for adjustment if the vertical adjustment is needed. The former technique is described in Patent Publication JP-2004-289011A, for example.

It is to be noted in the semiconductor waveguide that there arises a significant range of variation as to the position of the optical waveguide in the vertical direction, i.e., parallel to the stacking direction of semiconductor films, because the semiconductor substrate is subjected to polishing in the fabrication process. In addition, since the dimension of the waveguide is as small as in the range of several micrometers, and restricts the coupling tolerance between the optical-waveguide devices, a mere fine adjustment of the coupling lens may not well improve the coupling efficiency. Thus, a hybrid optical integrated device has been desired which allows an easy position alignment.

Patent Publication JP-2001-59925A describes an optical module which affords easy position alignment upon optically coupling together an optical-waveguide device including an optical waveguide and an optical element such as an optical lens. The optical module described in JP-2001-59925A employs the structure in which a holder mounting thereon optical elements including an optical isolator and an optical lens is position-aligned with an optical-waveguide device provided in the optical module in the state where the holder is supported on a holder support, and thereafter the holder is fixed onto the holder support that is fixed onto a base table in advance.

In the structure described in JP-2001-59925A, there is an advantage in that the position alignment between the optical element and the optical-waveguide device is achieved with ease. However, this publication is silent as to the structure wherein a plurality of optical-waveguide devices, if provided therein, are position-aligned with each other via an optical element, although the publication describes the position alignment between the optical element and the optical-waveguide device.

SUMMARY OF THE INVENTION

In view of the above, it is an object of the present invention to provide an improved optical module in which a plurality of optical-waveguide devices are optically coupled together via an optical element, and in which the optical coupling is effected with a higher positional accuracy and with ease, and to provide a method for manufacturing the same.

The present invention provides an optical module wherein a plurality of optical-waveguide devices each including an optical waveguide and mounted on a base table are optically coupled together via an optical system including an optical lens, the optical module including a support unit that supports at least one of the optical-waveguide devices on the base table, the support unit including:

a fixing member having a base of a substantially rectangular solid shape fixed onto the base table, and a pair of upright walls standing upright on a top surface of the base and extending to oppose each other; and a sub-mount unit of a substantially rectangular solid shape sandwiched between opposing wall surfaces of the pair of upright walls at opposing side surfaces of the sub-mount unit, to be supported by the upright walls apart from the base.

In addition, the present invention provides a method for manufacturing an optical module wherein a plurality of optical-waveguide devices each including an optical waveguide and mounted on a base table are optically coupled together via an optical system including an optical lens, the method including:

the step of preparing a fixing member having a base of a substantially rectangular solid shape and a pair of upright walls standing on a top surface of the base and extending to oppose each other;

the step of mounting at least one of the optical-waveguide devices on a sub-mount unit of a substantially rectangular solid shape having two opposing surfaces having therebetween an offset distance which is adapted to an offset distance between the pair of upright walls;

the step of inserting the sub-mount unit mounting thereon the optical-waveguide device between the pair of upright walls while sliding the opposing surfaces on wall surfaces of the pair of upright walls; and the step of position-aligning the at least one of the optical-waveguide devices with another optical-waveguide device via at least a part of the optical system, and thereafter fixing together the sub-mount unit and the fixing member and fixing together the fixing member and the base table.

In the optical module of the present invention and an optical module manufactured by the method of the present invention, when the plurality of optical-waveguide devices are optically coupled together via the optical system on the base table of the optical module, the optical-waveguide device is shifted for adjustment with respect to the base table in the state where the optical-waveguide device, sub-mount unit and fixing member are combined together, whereby adjustment of the position of the optical axis and the angle is performed with a higher accuracy and with ease. Thereafter, the sub-mount unit and the fixing member as well as the fixing member and the base table are fixed together, whereby an optical module is obtained having a higher optical coupling efficiency and capable of being manufactured with ease.

In addition, if the optical axes of both the optical-waveguide devices are deviated from each other due to positional deviation of the optical lens, for example, after the sub-mount is once fixed with respect to the base table, re-adjustment may be possible as by unfixing the sub-mount unit from the fixing member or unfixing the fixing member from the base table. This improves the product yield upon reassembly of the package of the optical module.

In the conventional technique, if the positioning in the vertical direction is to be performed by using a spacer, a plurality of spacers having different heights must be prepared for the counterpart optical-waveguide device to be integrated. On the other hand, use of the combination of the sub-mount unit and the fixing member in the present invention can reduce the number of these members prepared for the species of products, because a combination of the sub-mount unit and fixing member having a specified shape can be used even for different shapes of the optical-waveguide devices to be integrated.

BRIEF DESCRIPTION OF THE DRAWINGS

FIG. 7 includes top plan views and sectional views consecutively showing the steps subsequent to the steps of FIG. 6.

FIG. 11 includes a sectional view showing an optical-waveguide device together with a support unit in an optical module according to a third embodiment of the present invention, and a perspective view showing the optical-waveguide device together with the support unit.

BEST MODE FOR CARRYING OUT THE INVENTION

Figure 1:
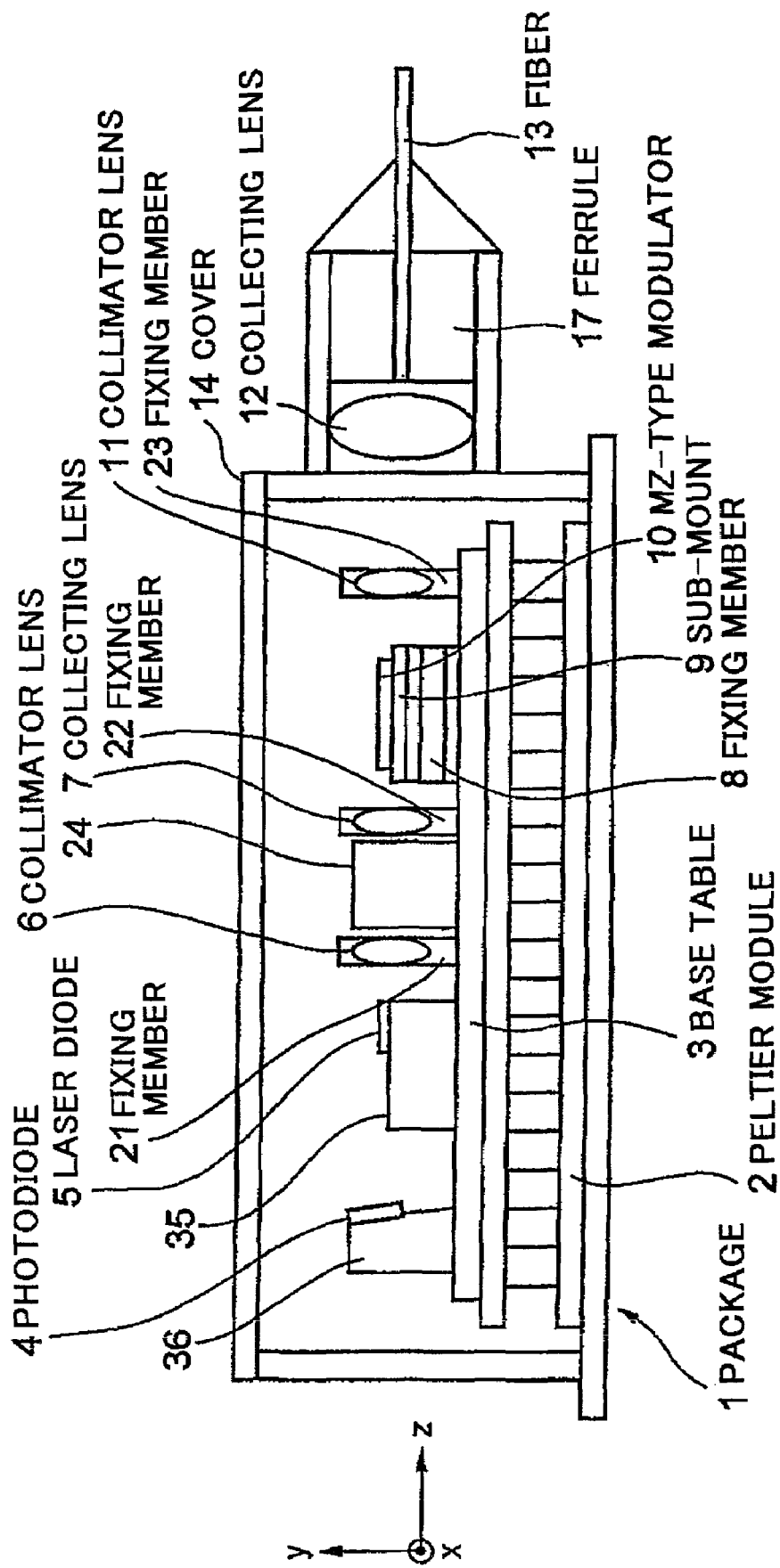
FIG. 1 is a longitudinal-sectional view of an optical module according to a first embodiment of the present invention.

Hereinafter, embodiments of the present invention will be described with reference to the drawings. In the drawings, similar constituent elements are designated by similar reference numerals.

FIG. 1 is a longitudinal-sectional view showing an optical module according to a first embodiment of the present invention. The optical module is comprised of a plurality of optical-waveguide devices 5, 10, and an optical system 6, 24, 7, 11 including optical lenses, which are mounted on a base table 3 received in a package 1, and an optical system 12, 13 located outside the package. This optical module is optically coupled to an optical fiber 13. The base table 3 is mounted on a Peltier module 2 configuring a temperature adjuster, wherein the Peltier module 2 removes quantity of heat generated by the optical-waveguide devices 5, 19.

The optical elements mounted on the base table 3 include a laser diode 5 and a MZ-type modulator 10. The laser diode 5 configures an optical-waveguide device which emits laser light of a specific wavelength, and a wavelength-variable laser diode of a DFB array type may be used therefor. The MZ-type modulator 10 configures an optical-waveguide device including a Mach-Zender(MZ)-type interference waveguide, modulating the laser light generated by the laser diode 5 to provide the same to the optical fiber 13. The MZ-type modulator 10 is mounted on the sub-mount unit 9, and fixed onto the base table 3 via a fixing member 8. A photodiode 4 receives the laser light generated by the laser diode 5, to monitor the intensity thereof.

The optical system in the package includes collimator lens 6, optical isolator 24 and collecting lens 7, which are provided for optically coupling the optical waveguide formed in the laser diode 5 with the MZ-type modulator 10. The collimator lens 11 and collecting lens 12 are provided for optically coupling the light emitted from the MZ-type modulator 10 to the optical fiber 13.

Figure 2:
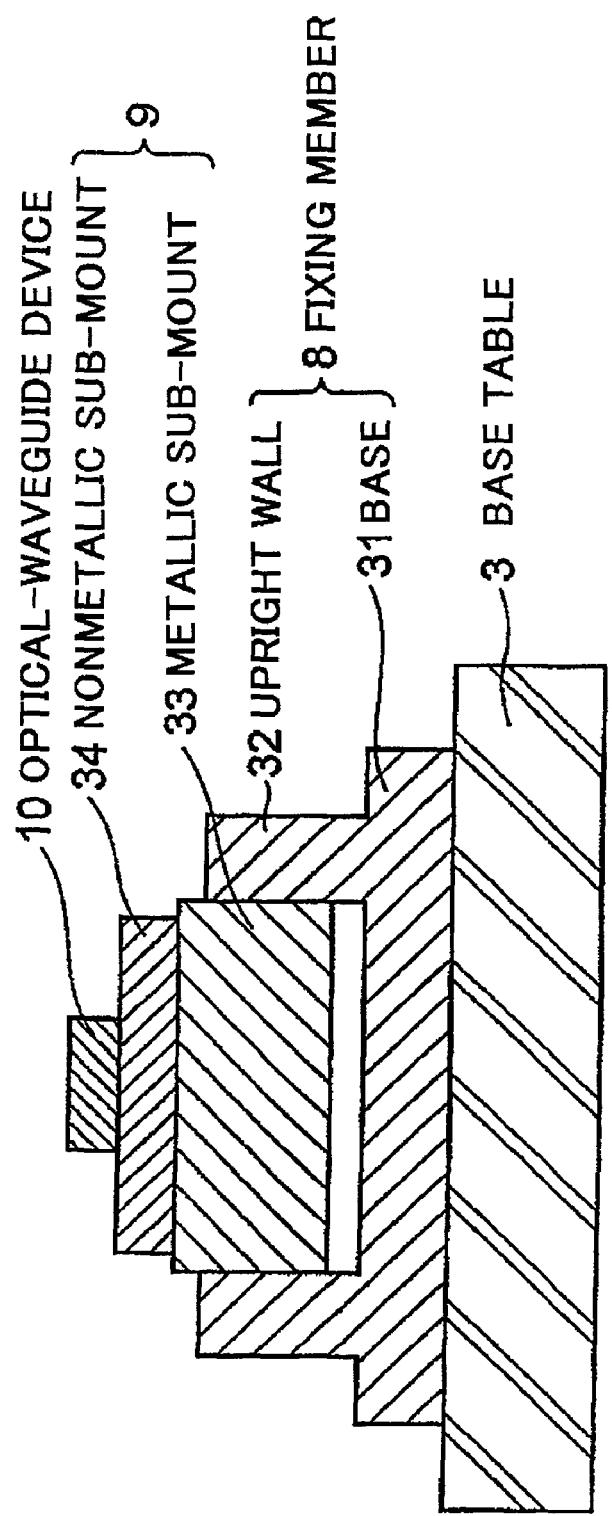
FIG. 2 is a cross-sectional view showing a MZ-type modulator in the optical module of FIG. 1 together with the support unit including the sub-mount unit and fixing member.

FIG. 2 shows the MZ-type modulator 10 mounted on the base table 3 in a cross-sectional view thereof. Onto the base table 3 is fixed a fixing member 8 made of a metal, which includes a base 31 and a pair of upright walls 32 standing upright on the base 31 and opposing each other. The fixation of the base table 3 and the base 31 is performed by spot welding of both the members by using YAG laser. Between the pair of opposing upright walls 32 of the fixing member 8 is sandwiched a metallic sub-mount 33 having a rectangular solid shape and mounting thereon the MZ-type modulator 10. The MZ-type modulator 10 is mounted on a nonmetallic sub-mount 34, which is mounted on the metallic sub-mount 33 as described above. The metallic sub-mount 33 and nonmetallic sub-mount 34 are soldered together to configure a sub-mount unit 9 which mounts thereon the MZ-type modulator 10. The MZ-type modulator 10 is positioned and fixed onto the base table 3 by a support unit which includes the sub-mount unit 9 and fixing member 8. The metallic sub-mount 33 has a widthwise dimension adapted to the offset distance between the opposing upright walls 32, whereby the MZ-type modulator 10 is sandwiched between the upright walls 32 to stay still there in the state wherein the metallic sub-mount 33 and nonmetallic sub-mount 34 are not applied with any external force.

Figure 3:
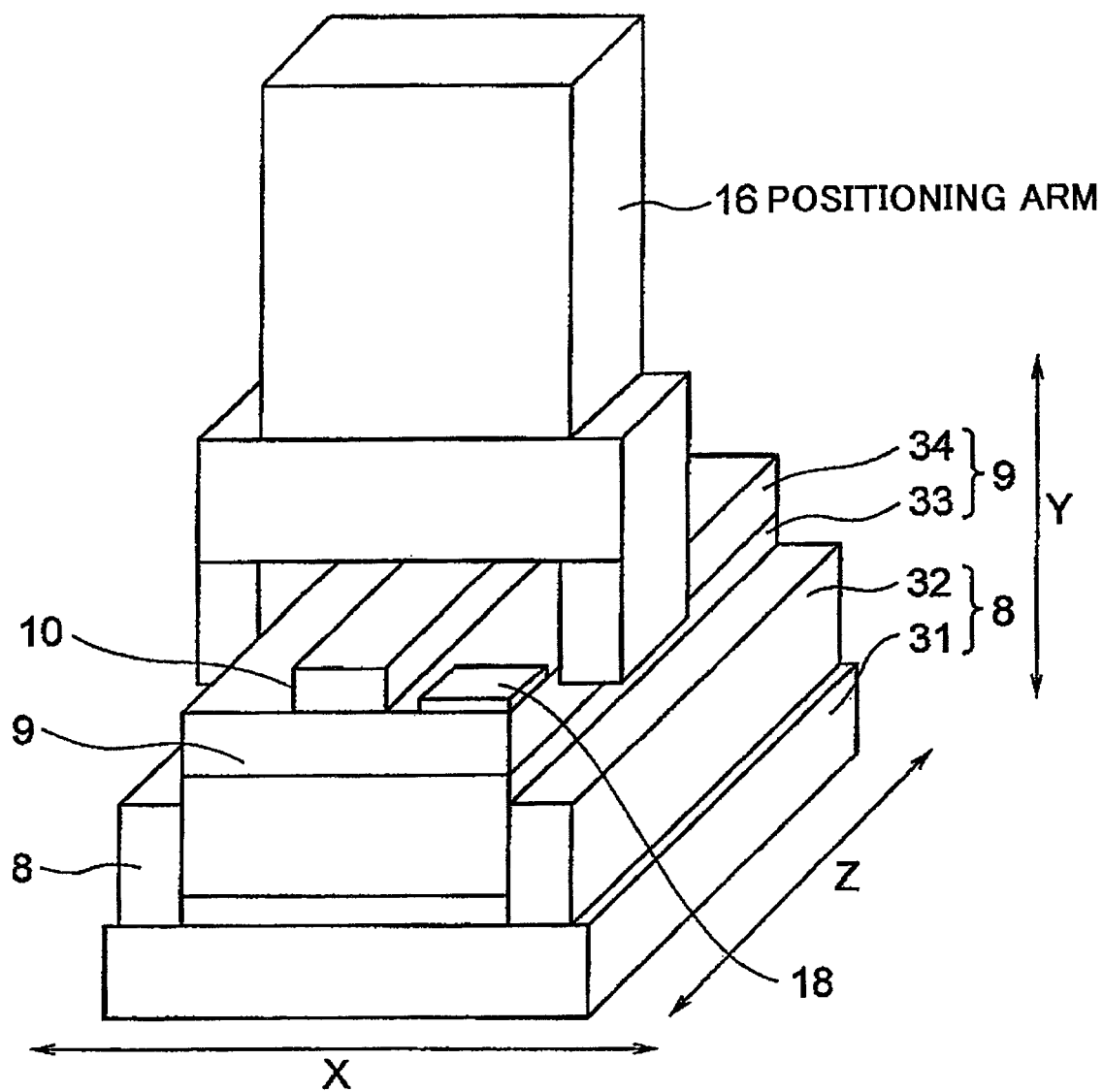
FIG. 3 is a perspective view showing the stage of positioning of the MZ-type modulator in FIG. 2.

FIG. 3 is a perspective view showing the stage of positioning the MZ-type modulator 10. The fixing member 8 is mounted on the base table 3. Subsequently, while the MZ-type modulator 10 is fixed onto the sub-mount unit 9 configured by the metallic sub-mount 33 and nonmetallic sub-mount 34, the sub-mount unit 9 is sandwiched by a positioning arm 16 for support and is then inserted between both the upright walls 32 of the fixing member 8. Thereafter, the laser diode 5 fixed in advance is operated to emit laser light. By operating the positioning arm 16, the sub-mount unit 9 is moved in the optical-axis direction (Z-direction) and the vertical direction (Y-direction), and in addition, by moving the sub-mount unit 9 in the lateral direction (X-direction) together with the fixing member 8 while locating the sub-mount unit 9 between the upright walls 32, the interference waveguide of the MZ-type modulator 10 and the waveguide of the laser diode 5 are position-aligned together.

Figure 4:
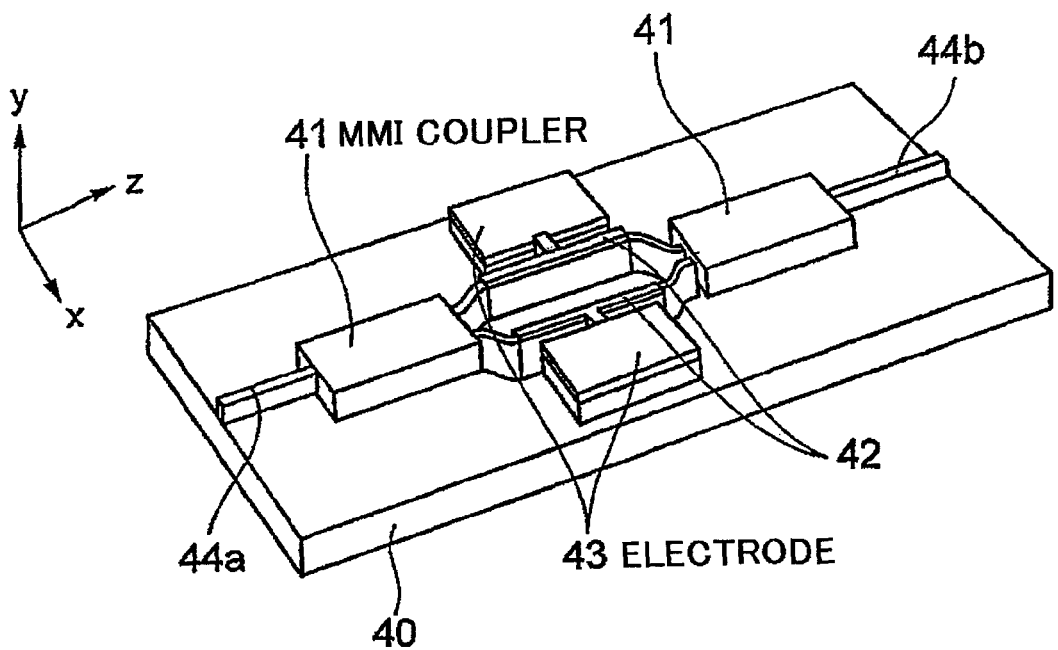
FIG. 4 is a perspective view showing the structure of the MZ-type modulator in FIG. 2.

FIG. 4 is a perspective view showing the structure of the MZ-type modulator 10. The MZ-type modulator 10 is a semiconductor device having a MZ(Mach-Zender)-type interference waveguide on a semiconductor substrate 40. The Mach-Zender-type interference waveguide branches the light incident onto a receiving waveguide 44a in the z-axis direction by using a MMI (multi-mode interferer) coupler 41, introduces the branched lights into a pair of arms 42, combines again the lights passed by the arms 42 in another MMI coupler 41, and emits the light through an emitting waveguide 44b. The arms 42 are each provided with an electrode 43, by which the arms 42 are applied with an electric field or current to change the optical path length of the arms 42, whereby the waveguide is used as an optical modulator. As to the length in the z-axis direction parallel to the optical axis, the arms 42 are about 1000-μm long, the MMI coupler 41 is about 100-μm long, and the entire element is around 2000-μm long.

Figure 5:
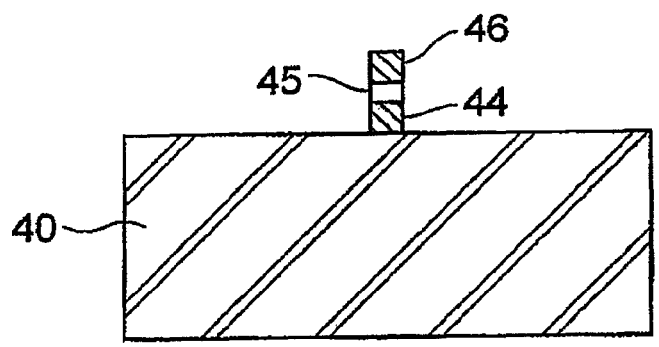
FIG. 5 is a cross-sectional view taken at an emitting/receiving optical waveguide part of the MZ-type modulator of FIG. 4.

FIG. 5 is a cross-sectional view taken along a plane normal to the optical axis direction at the receiving/emitting waveguide 44a, 44b in the MZ-type modulator shown in FIG. 4. The MZ-type modulator 10 is about 250-μm wide, and the substrate 40 is about 100-μm thick. The light propagates within the waveguide layer 45 sandwiched between the cladding layers 44 and 46. The waveguide layer 45 is about 2-μm wide, and about 0.4-μm thick. It is to be noted that although a high-mesa type waveguide structure is exemplified wherein the width of the active layer is substantially equal to the mesa width in FIGS. 4 and 5, the waveguide structure may be of a low-mesa type wherein the width of the active layer is larger than the mesa width, or a high-mesa type having a buried structure wherein both the sides of the active layer are buried by an insulator. In any type of the waveguide structures, the positioning tolerance is substantially equivalent because the width and thickness of the waveguide layer are substantially equal to those in the high-mesa type.

Figure 6:
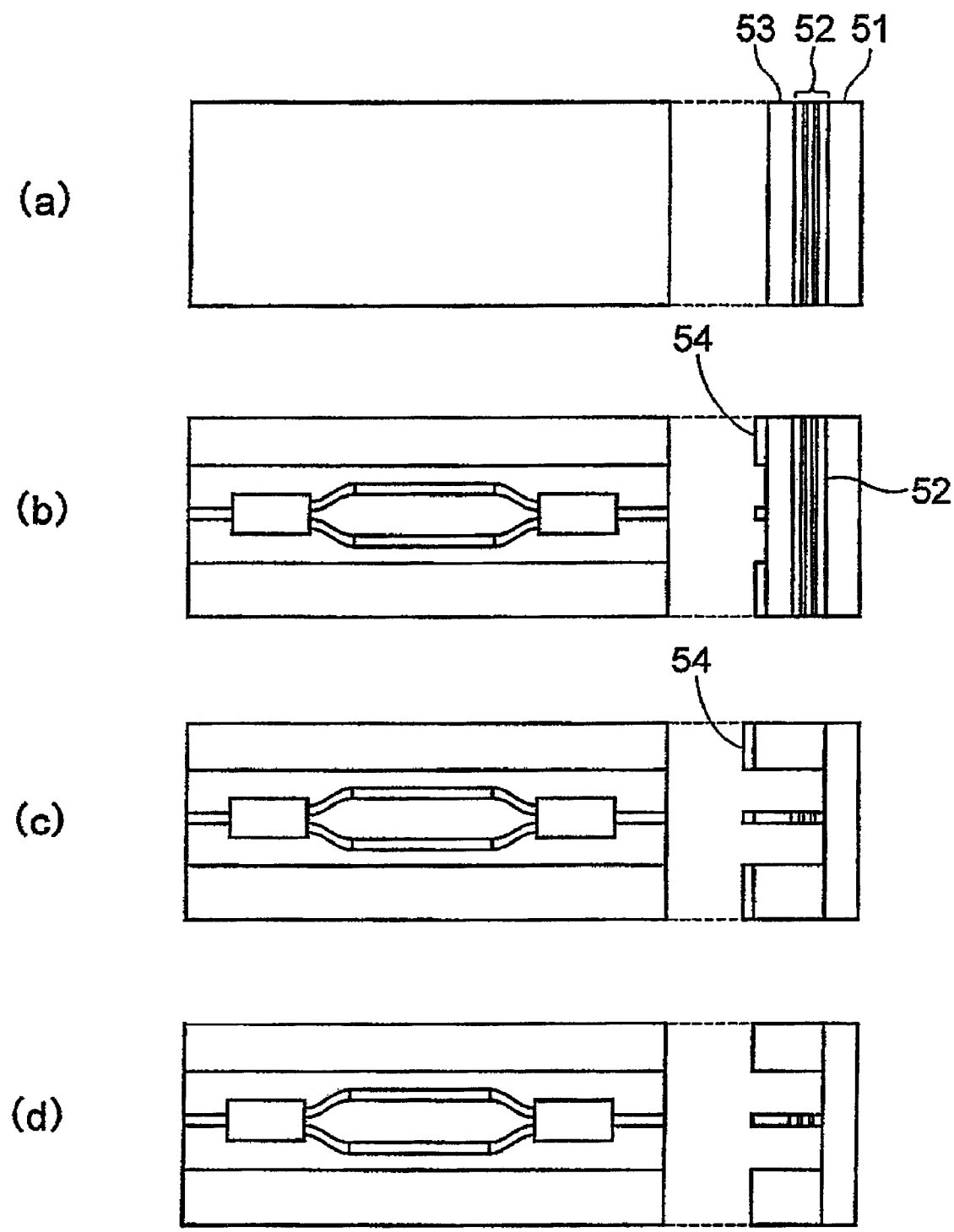
FIG. 6 includes top plan views and sectional views consecutively showing the steps for manufacturing the MZ-type modulator of FIG. 4.

With reference to (a) to (d) of FIG. 6 and (e) to (g) of FIG. 7, a method for manufacturing the MZ-type modulator will be described hereinafter (each figure of (a) to (d) of FIG. 6 and (e) to (g) of FIG. 7 includes a top plan view on the left side and a sectional view on the right side). In this description, the MZ-type modulator of the high-mesa type will be exemplified. To begin with, an active layer 52 and an upper cladding layer 53 of the waveguide are grown on a substrate 51 by using a MOCVD epitaxial growth system (FIG. 6(a)). Subsequently, a SiNx film 54 is deposited using an evaporation technique, followed by transferring a waveguide pattern onto the SiNx film 54 by using photoresist and a photomask (FIG. 6(b)). Thereafter, a waveguide layer is formed by etching using a dry etching system such as ICP and the SiNx film 54 as a mask (FIG. 6(c)). Thereafter, in the case of forming a waveguide layer of a buried type, both the sides of the waveguide layer is buried with an insulator.

Thereafter, the SiNx film 54 is removed (FIG. 6(d)). Subsequently, an insulator film such as a SiNx film 55 is deposited on the entire surface by evaporation (FIG. 7(e)). A portion of the SiNx film 55 where an electrode is to be formed is removed using photoresist and a photomask, followed by forming the electrode 56 by using photoresist and a photomask (FIG. 7(f)). Thereafter, the bottom surface of the substrate 51 is polished, followed by forming an electrode 57 on the bottom surface of the substrate (FIG. 7(g)).

The polishing of the bottom surface of the substrate is conducted for the purpose of forming the electrode 57 and of chip separation after forming the device. Thus, the polishing of the bottom surface of the substrate is indispensable; however, control of the substrate thickness in the order of several micrometers is difficult to achieve, wherein a significant range of variation of the waveguide in the vertical direction cannot be avoided. In accordance with the optical module of the above embodiment, the fixing member 8 is used for dealing with the range of variation of the MZ-type modulator 10 in the vertical direction, whereby the waveguide of the MZ-type modulator 10 and the waveguide of the laser diode 5 are aligned together for the position and also for the optical axis.

A method for manufacturing the optical module of FIG. 1 will be described hereinafter. A piece of base table 3 made of a material such as CuW is prepared, and a sub-mount 35 onto which a laser diode 5 is fixed at the top side by using solder such as Au—Sn is then fixed onto the base table 3 by using solder. The latter solder may be the same as or may have a melting point lower than that of the Au—Sn solder, by which the laser diode 5 is fixed onto the sub-mount 35.

Thereafter, a sub-mount 36 onto which a photodiode 4 is fixed at the top by using solder such as Au—Sn is fixed onto the base table 3. The solder used therein may be same as the solder used for the laser diode 5. Subsequently, the laser diode 5 is driven, a collimator lens 6 mounted on the fixing member 21 is position-aligned and fixed onto the base table 3 by YAG welding while observing the passed light with a camera. The fixing member 21 is made from a material, such as a Fe—Ni—Co alloy, adapted for laser welding.

Thereafter, the laser diode 5 is driven and an isolator 24 is fixed onto the base table 3 by YAG welding while observing the passed light with a camera. Further, the laser diode 5 is driven, and a collecting lens 7 mounted on the fixing member 22 is position-aligned and fixed onto the base table 3 by YAG welding. The fixing member 22 is made from a material such as a Fe—Ni—Co alloy adapted for the YAG welding. Further, the position and depression angle of the MZ-type modulator 10 mounted on the sub-mount unit 9 sandwiched and supported by the fixing member 8 are adjusted so that the intensity of the passed light assumes a maximum. During the adjustment, as shown in FIG. 3, the positioning arm 16 supporting the sub-mount unit 9 is moved to thereby move the fixing member 8 and sub-mount unit 9 mounting thereon the MZ-type modulator 10 in a unitary body.

More specifically, the sub-mount unit 9 is moved, while being sandwiched between the upright walls 32, together with the fixing member 8 on the base table 3 in the x-direction. Thereafter, the sub-mount unit 9 is similarly moved, while being sandwiched between the upright walls 32, in the y-direction. Subsequently, the sub-mount unit 9 is moved in the z-direction in a similar situation, followed by fixing the depression angle thereof.

After the position of the MZ-type modulator 10 fixed onto the sub-mount unit 9 is fixed, the metallic sub-mount 33 of the sub-mount unit 9 and the fixing member 8 as well as the fixing member 8 and the base table 3 are fixed together by spot YAG welding. The metallic sub-mount 33 and the fixing member 8 are each made of a material such as a Fe—Ni—Co alloy adapted for the laser welding. Thus, a base table module to be installed in the package is completed.

Thereafter, the Peltier module 2 is fixed onto the package 1 by using Sn—Pb solder, followed by interconnecting the Pelitier module 2 and electrodes of the package 1. Subsequently, the base table 3 of the base table module completed before is fixed onto the Peltier module 2 by using InPbAg solder. Further, the laser diode 5, photodiode 4, MZ-type modulator 10 on the nonmetallic sub-mount 34 and thermistor 18 are connected to respective electrodes of the package 1.

Thereafter, a cover 14 is welded to seal the package. The laser diode 5 is driven via the electrodes of the package 1, and the optical system including the collecting lens 12 and the optical fiber 13 supported by a ferrule 17 is fixed at the outlet of the package so that the intensity of the coupling light thereof with respect to the laser diode 5 assumes a maximum.

In the above embodiment, since the MZ-type modulator 10 including a fine optical waveguide is position-aligned while moving the same, the optical coupling efficiency thereof can be improved. In addition, the product yield during assembly of the optical module can be also improved.

Figure 8:
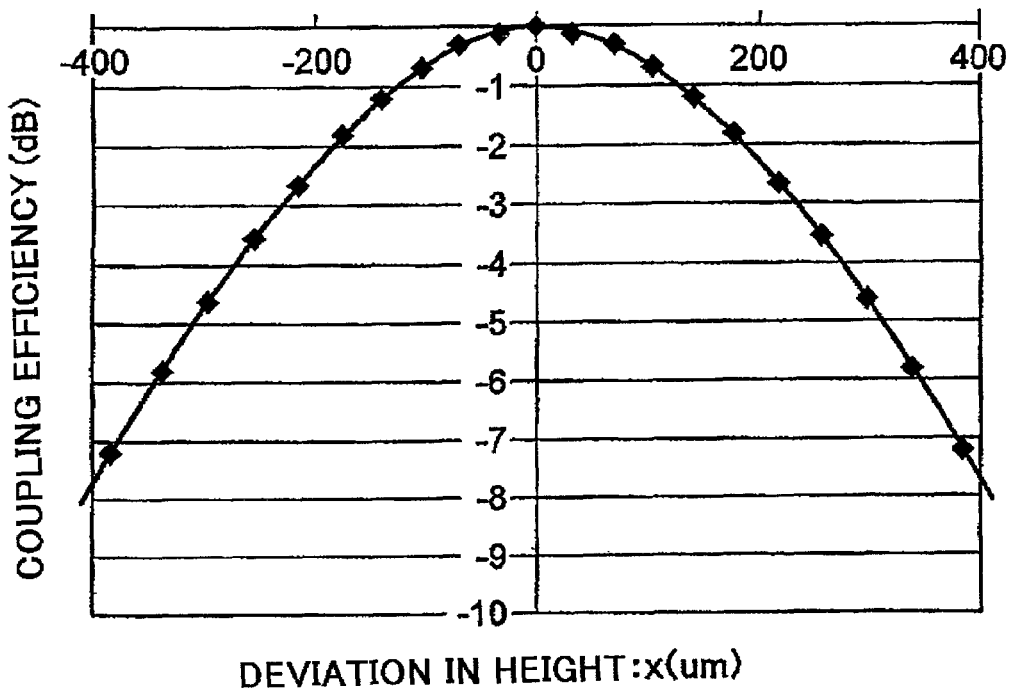
FIG. 8 is a graph showing the change of coupling efficiency plotted against dimensions of the deviation in the vertical direction from the optical axis of the optical-waveguide device.

FIG. 8 shows change of the coupling efficiency with respect to deviations in the height from the optical axis of the optical-waveguide device in the case of the focal distance of the collecting lens 7 being 700 micrometers. In FIG. 8, variation in the height is plotted on abscissa in terms of micrometers, and the coupling efficiency is plotted on ordinate in terms of dB. In the conventional technique, variation in the thickness of the optical-waveguide device etc. incurs a deviation of around 200 micrometers in the optical axis, thereby reducing the coupling efficiency by about 2 dB. On the other hand, in the present invention, since the fixed position of the optical-waveguide device can be adjusted, reduction in the coupling efficiency is substantially zero dB. In other word, use of the present invention is expected to improve the coupling efficiency by about 1.6 times.

In the above embodiment, a MZ-type modulator is exemplified as the optical-waveguide device 10. However, the optical-waveguide device 10 to be mounted on the sub-mount unit 9 is not limited to the MZ-type modulator, and may be any of the optical-waveguide devices such as wavelength converter, optical switch, AWG, and ring oscillator, so long as the optical-waveguide device includes an optical waveguide. For example, a combination of ring oscillator and FP(Fabry-Perot)-type laser diode, if employed, may configure a wavelength-variable laser module.

Figure 9:
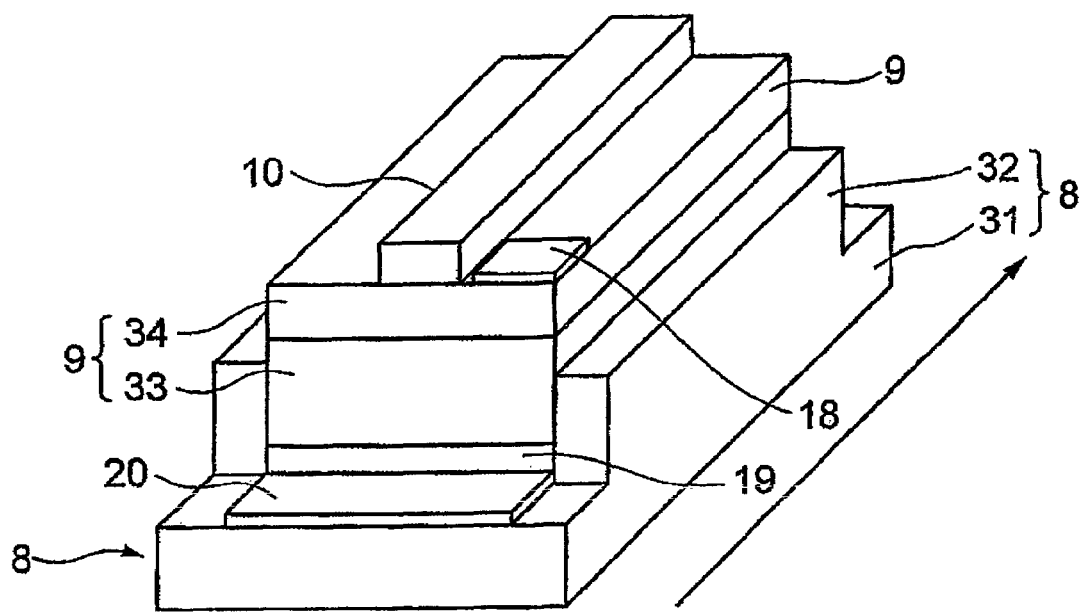
FIG. 9 is a perspective view showing, together with a support unit, an optical-waveguide device in an optical module according to a second embodiment of the present invention.
Figure 10:
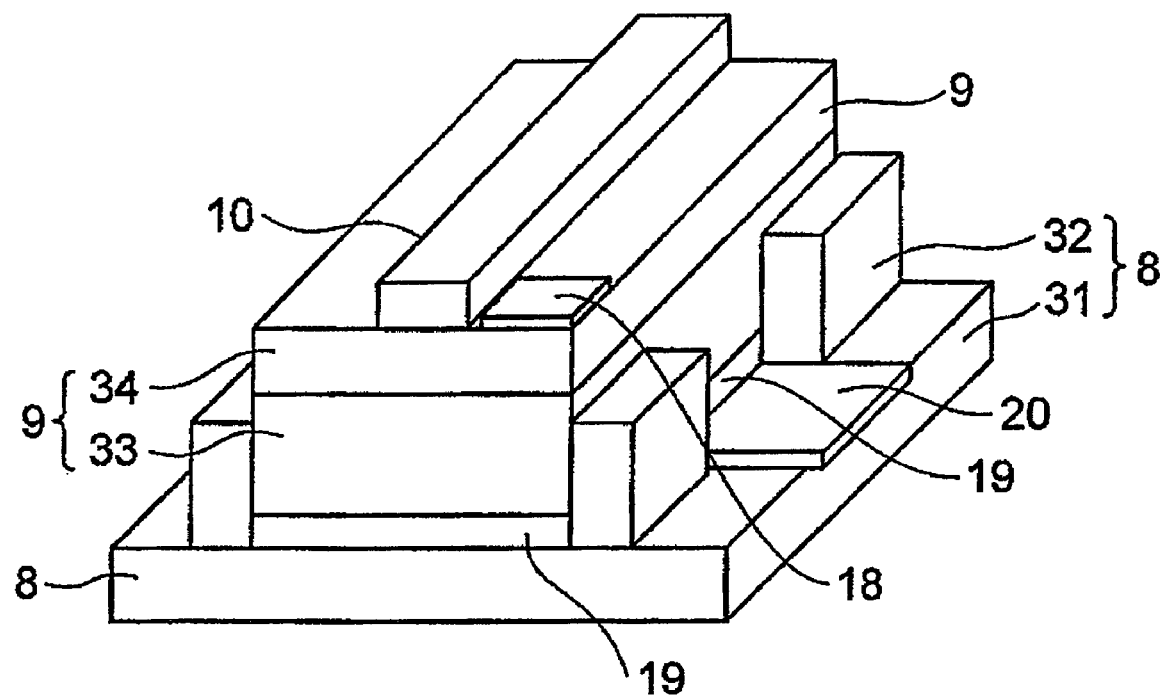
FIG. 10 is a perspective view showing an optical-waveguide device together with a support unit in a modification of the optical module according to the second embodiment of the present invention.

FIGS. 9 and 10 each show an optical-waveguide device 10 employed in an optical module according to a second embodiment of the present invention, together with a fixing member 8, in a perspective view. In the example of the present embodiment, the gap between the bottom surface of the metallic sub-amount 33 of the sub-mount unit 9 and the top surface of the base 31 of the fixing member 8 is filled with a filling member 19 made of a heat conductive material (electric conductive material). Injection of the filling member 19 made of a heat conductive material allows the temperature of the optical-waveguide device 10 to be adjusted with ease via the fixing member 8.

In the embodiment of FIGS. 9 and 10, the top surface of the base 31 of the fixing member 8 and the bottom surface of the metallic sub-mount 33 are surface-treated with a material, such as a Ni/Au plating 20, having a superior wettability with respect to the solder used therein. After performing the YAG welding for fixing together the fixing member 8 and the base table 3 and for fixing together the fixing member 8 and the metallic sub-mount 33, solder is injected through the portion of the surface treatment. Specific solder, such as Sn—Pb solder, having a higher melting point than the InPbAg solder used for fixing together the Peltier module 2 and the base table 3 is used herein. In FIG. 9, there is a possibility that, depending on the focal distance of the collecting lens 7 and collimator lens 11 used therein, the length of the fixing member 8 in the direction of the waveguide is restricted, whereby the space for injecting the solder is not assured. In such a case, the following procedure may be employed: part of the upright walls 32 is cut off at the intermediate position, the cut-off position is surface-treated, and the solder is injected through the surface-treated position, as exemplified in FIG. 10.

FIGS. 11(a) and (b) are a sectional view showing, together with a fixing member 8, an optical-waveguide device 10 used in an optical module according to a third embodiment of the present invention, and a perspective view of the optical-waveguide device 10 including the sub-mount unit 9, respectively. In the present embodiment, a metallic plate (metallic sub-mount) 33 is attached onto each side surface of the nonmetallic sub-mount 34 of a rectangular solid shape. This configuration allows the spot YAG welding to be performed between the sub-mount unit 9 and the upright walls 32. A metallic plate (material: FeNiCo, for example) suited to laser welding is attached onto the side surfaces of the sub-mount with solder in advance.

Figure 12:
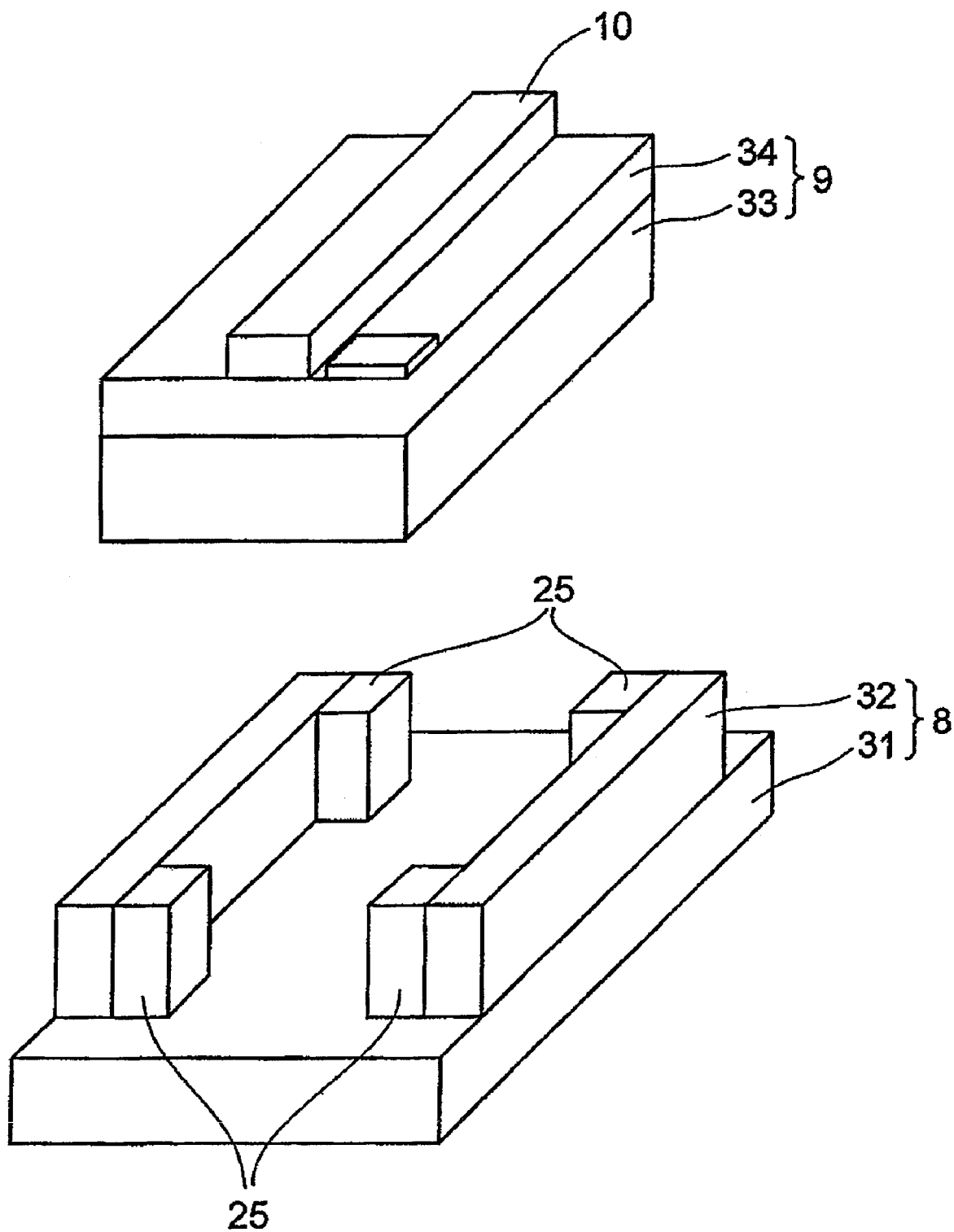
FIG. 12 is an exploded view showing an optical-waveguide device and a support unit in an optical module according to a modification of the first embodiment.

FIG. 12 is a perspective view depicting the sub-mount unit 9 and the fixing member 8 in a separate state, for the purpose of showing a modified example of the sub-mount unit in the optical module of the first embodiment of the present invention. In this modified example, protrusions 25 are arranged on the inner side of the upright walls 32, the protrusions having a size to allow the sub-mount unit 9 to pass therethrough. This configuration reduces the amplitude of the swing of the sub-mount unit 9 in the direction of the depression angle, thereby improving the optical coupling efficiency.

Although the present invention is described as above based on the preferred embodiments thereof, the optical module of the present invention and the method for manufacturing the same are not limited to the configuration of the above embodiments, and a variety of modifications and alterations made from the above embodiments may fall within the scope of the present invention.

The invention claimed is:

1. An optical module comprising:
  a base table;
  a plurality of optical-waveguide devices mounted on said base table, said plurality of optical-waveguide devices each including an optical waveguide;
  an optical system including an optical lens, said optical system being configured to optically couple said plurality of optical-waveguide devices; and
  a support unit configured to support at least one of said plurality of optical-waveguide devices on said base table,
  wherein said support unit includes:
    a fixing member made of metal, said fixing member having a base of a substantially rectangular solid shape fixed onto said base table, and a pair of upright walls standing upright on a top surface of said base and extending to oppose each other; and
    a sub-mount unit of a substantially rectangular solid shape sandwiched between opposing wall surfaces of said pair of upright walls at opposing side surfaces thereof, said sub-mount unit including a first sub-mount made of a metal supported by said upright walls and a second sub-mount made of a nonmetal material supported by said first sub-mount and mounting thereon said at least one of said optical-waveguide devices, the sub-mount unit being supported by said upright walls apart from said base.

2. The optical module according to claim 1, wherein said first sub-mount includes two metallic plates sandwiching therebetween said second sub-mount on both lateral sides thereof.

3. The optical module according to claim 1, wherein said base table and said fixing member, as well as said fixing member and said sub-mount unit, are fixed together by spot welding.

4. The optical module according to claim 1, wherein a gap between a bottom surface of said sub-mount unit and said top surface of said base is filled with a filling member made of a heat-conductive material.

5. The optical module according to claim 4, wherein said filling member includes solder having a melting point that is higher than a melting point of solder that fixes said base table within a package.

6. The optical module according to claim 5, wherein said bottom surface of said sub-mount unit and said top surface of said base are plated prior to being filled by said filling member.

7. A method of manufacturing an optical module comprising:
preparing a fixing member made of metal, the fixing member including a base of a substantially rectangular solid shape and a pair of upright walls standing on a top surface of said base and extending to oppose each other;

preparing a plurality of optical-waveguide devices each having an optical waveguide;

mounting at least one of said plurality of optical-waveguide devices on a sub-mount unit of a substantially rectangular solid shape having two opposing surfaces which are adapted to an offset distance between said pair of upright walls, said sub-mount unit including a first sub-mount made of a metal and a second sub-mount made of a nonmetal material supported by said first sub-mount, wherein said at least one of said plurality of optical-waveguide devices is mounted on said second sub-mount of said sub-mount unit;

inserting said sub-mount unit mounting thereon said optical-waveguide device while sliding said opposing surfaces of said sub-mount unit on wall surfaces of said two upright walls; and optically coupling said at least one of said plurality of optical-waveguide devices with another of said plurality of optical-waveguide device via an optical system including an optical lens, and thereafter fixing together said first sub-mount of said sub-mount unit and said upright walls of said fixing member and fixing together said base of said fixing member and said base table.

8. The method according to claim 7, wherein said optically coupling uses spot welding.

9. The method according to claim 8, further comprising:
filling a gap between a bottom surface of said sub-mount unit and said top surface of said base with a filling member made of a heat-conductive material.

* * * * *